US012169787B1

(12) United States Patent
Walters et al.

(10) Patent No.: US 12,169,787 B1
(45) Date of Patent: Dec. 17, 2024

(54) ASSESSING PROPORTIONAL FAULT IN AN AUTOMOBILE ACCIDENT

(71) Applicant: Allstate Insurance Company, Northbrook, IL (US)

(72) Inventors: Meg G. Walters, Chicago, IL (US); Mark S. Richards, Lexington, KY (US)

(*) Notice: Subject to any disclaimer, the term of this patent is extended or adjusted under 35 U.S.C. 154(b) by 1254 days.

(21) Appl. No.: 16/868,780

(22) Filed: May 7, 2020

(51) Int. Cl.
*G06Q 20/40* (2012.01)
*G06N 5/04* (2023.01)
*G06N 20/00* (2019.01)
*G07C 5/08* (2006.01)

(52) U.S. Cl.
CPC ............... *G06N 5/04* (2013.01); *G06N 20/00* (2019.01); *G07C 5/085* (2013.01)

(58) Field of Classification Search
CPC .................................. H04W 4/80; H04W 4/40
See application file for complete search history.

(56) References Cited

U.S. PATENT DOCUMENTS

2020/0257308 A1* 8/2020 Herman ............... G05D 1/0231

* cited by examiner

*Primary Examiner* — Ojo O Oyebisi
(74) *Attorney, Agent, or Firm* — Dinsmore & Shohl LLP

(57) ABSTRACT

Methods, computer-readable media, software, and apparatuses may assist in assessing proportional fault in an automobile accident involving an automobile having one or more autonomous features. An expected behavior of an autonomous feature is compared to an observed outcome of an accident and a fault proportion between a human driver and the autonomous feature may be determined, based on the comparison.

21 Claims, 6 Drawing Sheets

ASSESSING PROPORTIONAL FAULT IN AN AUTOMOBILE ACCIDENT

FIELD OF ART

Aspects of the disclosure generally relate to methods and computer systems, including one or more computers particularly configured and/or executing computer software. More specifically, aspects of this disclosure relate to methods and systems for assessing proportional fault in an automobile accident involving a vehicle having one or more autonomous features, such as an autonomous driving feature.

BACKGROUND

Liability or fault in an automobile accident has typically been assigned to human drivers of one or more vehicles. For example, if a driver failed to yield, or failed to stop, that driver typically was assigned 100% of the liability for an accident. As technology and connectivity in vehicles and in road networks become more prevalent, and as operations historically performed by human drivers are being performed by autonomous features or systems in the vehicle, the determination of a cause of a vehicle accident and the determination of fault among one or more human drivers and these autonomous systems becomes more complicated. For example, in addition to the human driver of the vehicle, possible accident fault may lie with various autonomous systems and their components, including vehicle sensor hardware, onboard computer hardware or software, wireless communication equipment, and/or in-vehicle road network maps, among others.

The determining of losses related to vehicle accidents will increasingly need to consider product liability, due to these automated systems, in addition to personal liability.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for determining an expected behavior of an autonomous system in a vehicle, determining an observed behavior of the system during an accident, and determining a fault proportion between a human driver of the vehicle and the autonomous system, based on a difference between the expected behavior and the observed behavior.

In some aspects, expected behaviors of autonomous systems and human drivers may be modeled via machine learning, and fault proportions (liability) may be assessed using differences between the model and what actually occurred during an accident. The modeling may be based on historical data, such as past driving behavior of the human driver, information about the autonomous systems on the vehicle, and information from an insurance provider computing system, among others. Patterns and similarities of accidents associated with certain autonomous feature hardware, software, and/or software versions may be determined.

In an embodiment, sensors, location information, video, and written reports may be used in a machine learning algorithm to automatically assess proportions of fault among each automated system of a vehicle involved in an accident.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for determining liability or fault for an automobile accident involving a vehicle having an autonomous feature, based on various factors, including telematics information from vehicle sensors, information from the location of the accident, reports of the accident, information associated with autonomous features that were activated, and information about the human driver.

Autonomous features, as discussed herein, refer to features of a vehicle which automate the performance of an aspect of operation of the vehicle. Example autonomous features may include forward collision detection with automatic braking, lane keep assist, road sign recognition, adaptive cruise control, and parking assist, among others.

In accordance with various aspects of the disclosure, after an accident has occurred, a portion of liability may be assessed to a human driver of a vehicle and a portion of the liability may be assessed to an autonomous hardware or software component of the vehicle. While the disclosure herein may, in some places, refer to a single human driver and/or a single vehicle, it should be understood that the methods disclosed herein are applicable to multiple human drivers and multiple vehicles. For example, in some embodiments corresponding to accidents involving multiple vehicle, portions of liability may be assessed among multiple human drivers and portions of the liability may be assessed among autonomous hardware or software components of the multiple vehicles.

In accordance with various aspects of the disclosure, machine learning may be used to determine expected behaviors of an autonomous system and a human driver and identify fault proportions based on differences between the expected behaviors and what actually happened during an accident.

In the following description of the various embodiments of the disclosure, reference is made to the accompanying drawings, which form a part hereof, and in which are shown by way of illustration, various embodiments in which the disclosure may be practiced. It is to be understood that other embodiments may be utilized and structural and functional modifications may be made.

Figure 1:
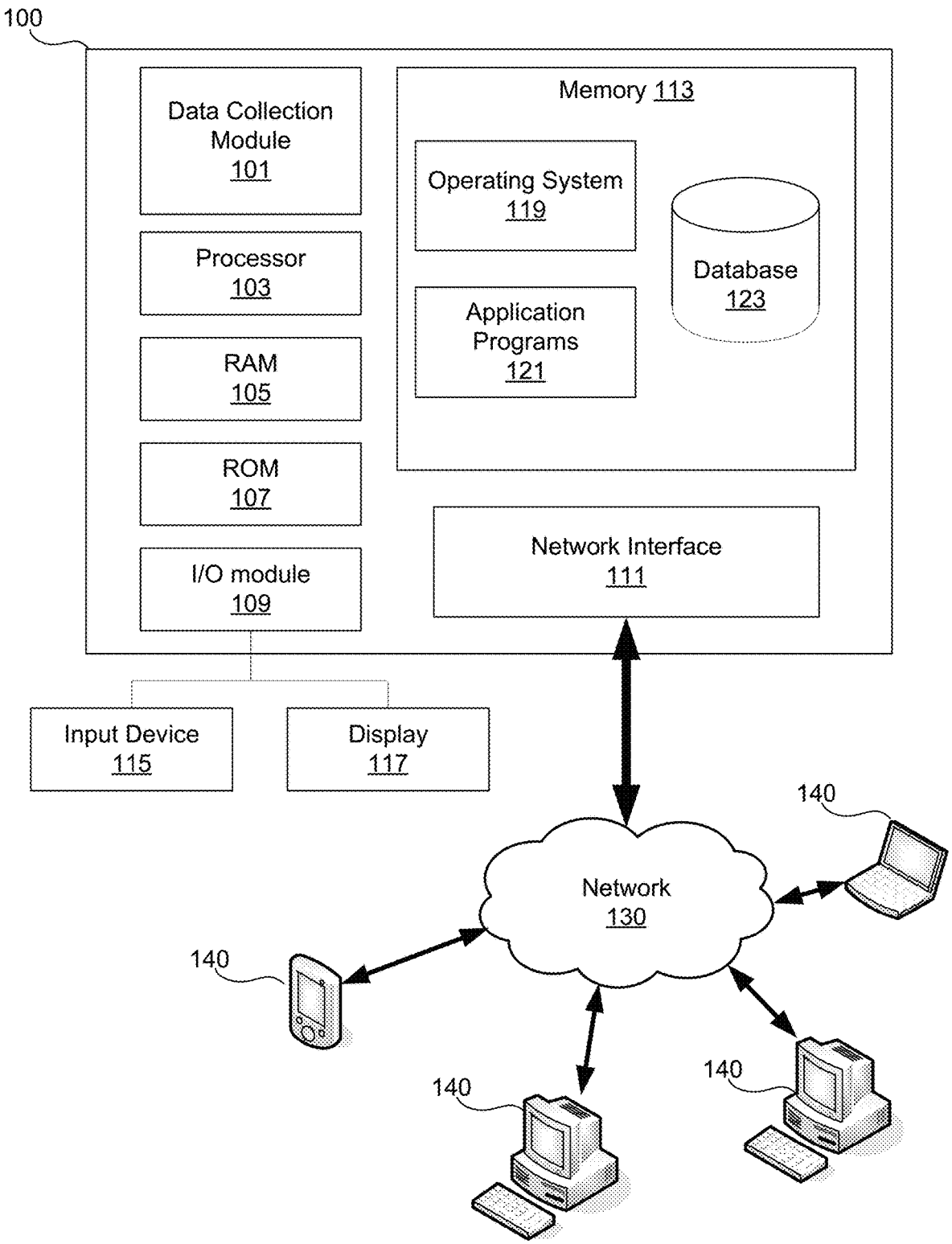
FIG. 1 illustrates an example computing device as may be used in accordance with one or more aspects described herein.

In one or more arrangements, aspects of the present disclosure may be implemented using a computing device. FIG. 1 illustrates a block diagram of an example fault assessment system 100 that may be used in accordance with aspects described herein. The fault assessment system 100 may be a computing device, such as a personal computer (e.g., a desktop computer), server, laptop computer, notebook, tablet, smartphone, vehicles, home management devices, home security devices, smart appliances, etc. The fault assessment system 100 may be implemented with one or more processors 103 and one or more storage units (e.g., databases 123, RAM 105, ROM 107, and other computer-readable media), one or more application specific integrated circuits (ASICs), and/or other hardware components (e.g., resistors, capacitors, power sources, switches, multiplexers, transistors, inverters, etc.). Throughout this disclosure, the fault assessment system 100 may refer to the software and/or hardware used to implement the fault assessment system 100. In cases where the fault assessment system 100 includes one or more processors, such processors may be specially configured to perform the processes disclosed herein. Additionally, or alternatively, the fault assessment system 100 may include one or more processors configured to execute computer-executable instructions, which may be stored on a storage medium, to perform the processes disclosed herein. The processor(s) 103 may be capable of controlling operations of the fault assessment system 100 and its associated components, including RAM 105, ROM 107, an input/output (I/O) module 109, a network interface 111, and memory 113. For example, processor(s) 103 may each be configured to read/write computer-executable instructions and other values from/to the RAM 105, ROM 107, and memory 113. The fault assessment system 100 may have a data collection module 101 for retrieving and/or analyzing data as described herein.

The I/O module 109 may be configured to be connected to an input device 115, such as a microphone, keypad, keyboard, touchscreen, and/or stylus through which a user of the fault assessment system 100 may provide input data. The I/O module 109 may also be configured to be connected to a display device 117, such as a monitor, television, touchscreen, etc., and may include a graphics card. The display device 117 and input device 115 are shown as separate elements from the fault assessment system 100; however, they may be within the same structure. On some fault assessment system 100, the input device 115 may be operated by users to interact with the fault assessment system 100, for example, to input reports (such as police reports and accident reports, among others), vehicle information, images/video, telematics information, etc., as described in further detail below. System administrators may use the input device 115 to make updates to the fault assessment system 100, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the fault assessment system 100 to perform various functions. For example, memory 113 may store software used by the fault assessment system 100, such as an operating system 119 and application programs 121, and may include an associated database 123. In some embodiments, the application programs 121 may include one or more machine learning algorithms, as discussed below.

The network interface 111 may allow the fault assessment system 100 to connect to and communicate with a network 130. The network 130 may be any type of network, including a local area network (LAN) and/or a wide area network (WAN), such as the Internet, a cellular network, or a satellite network. Through the network 130, the fault assessment system 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as fault assessment system 100. In some embodiments, the fault assessment system 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
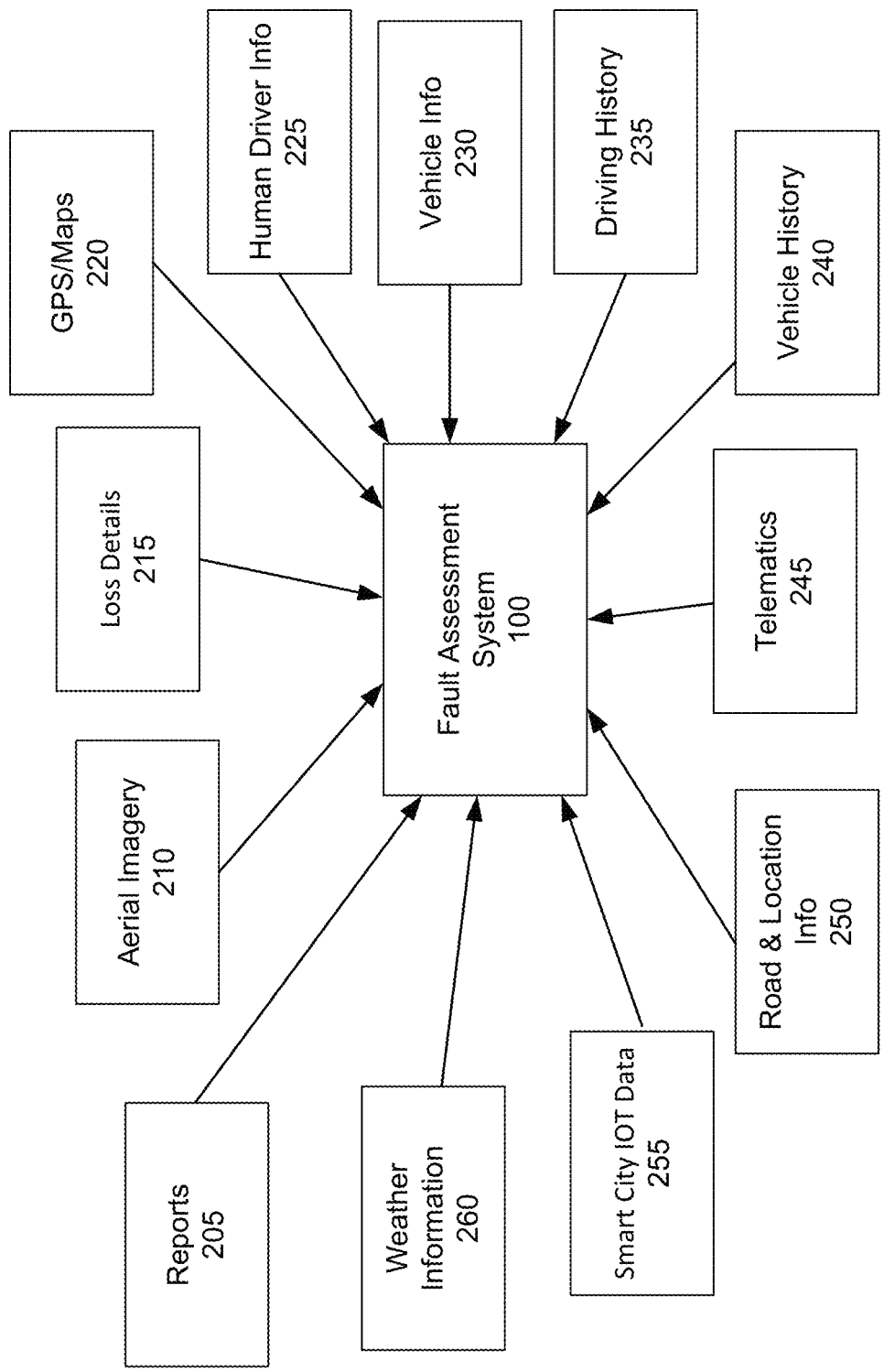
FIG. 2 shows a diagram illustrating inputs to a fault assessment system in accordance with one or more aspects described herein.

FIG. 2 is a block diagram illustrating inputs to fault assessment system 100. The fault assessment system 100 may receive various information as input, and may use this information in determining a fault assessment pertaining to an automobile accident, as further discussed below. In various embodiments, the fault assessment system 100 may receive other inputs, in addition to those depicted in FIG. 2, and may receive a subset of the inputs depicted. The inputs may be received via the network interface 111 of FIG. 1.

In some embodiments, the fault assessment system 100 may receive reports 205, such as claims adjuster notes, police reports, witness statements, and reports including telecommunication records. Text from images/scans of these reports, notes, and statements may be extracted using techniques from computer vision, such as Optical Character Recognition (OCR) techniques, and then natural language processing techniques may be used to extract meaningful information for use by the fault assessment system 100.

In some embodiments, the fault assessment system 100 may receive aerial imagery 210, such as imagery of the accident site or scene, which may include satellite images and/or images taken by an aerial drone. For example, the aerial imagery 210 may provide details about the geometry of a roadway, a type of intersection (3-way, 4-way, for example), or the presence of driveways and/or exits along the roadway.

In some embodiments, the fault assessment system 100 may receive loss details 215, such as photos and/or videos of a damaged vehicle, injury details, and/or loss amounts. These inputs may be received from insurance provider computing systems, among others.

In some embodiments, the fault assessment system 100 may receive GPS data or maps 220, associated with the accident scene or with one or more vehicles involved in the accident or present during, before, or after the accident. The GPS data or maps may include accuracy information.

In some embodiments, the fault assessment system 100 may receive human driver information 225 which may include information about the human driver operating a vehicle. The human driver information may include personal information, such as the age of the human driver, any restrictions on the driving license of the human driver, the type of license held by the human driver, and the type of vehicle insured by the human driver, among others. The human driver information may also include a driving history of the human driver, providing information about prior accidents and prior moving violations, including speeding tickets or citations related to driving infractions. In some embodiments, the fault assessment system 100 may receive human driver information 225 corresponding to a plurality of human drivers.

In some embodiments, the fault assessment system 100 may receive vehicle information 230, which may include an indication of the level of automation supported by the vehicle, or by systems in the vehicle, an indication of what autonomous features are supported by the vehicle, information about sensors and/or computer hardware in the vehicle, information indicative of the software versions of various software components, version of mapping software in the vehicle, information indicative of any outstanding recalls related to vehicle systems, and information pertaining to the body style and weight of the vehicle. For example, the vehicle information 230 may indicate that the vehicle has a forward collision mitigation system, its associated software and hardware versions, and features supported, such as automatic emergency braking below 45 mph. The vehicle information 230 may be used by the fault assessment system 100 in determining how the vehicle is expected to behave.

In some embodiments, the fault assessment system 100 may receive driving history 235, which may represent the driving history of a vehicle, such as driving route patterns previously taken by the vehicle, previous occurrences of hard braking and/or speeding, and mobile phone use by the human driver of the vehicle. Driving history 235 may be captured and retained by in-vehicle systems, such as hands-free systems, vehicle on-board computers, or in-vehicle GPS/mapping systems.

In some embodiments, the fault assessment system 100 may receive vehicle history 240, which may include any salvage history, a history of software upgrades, maintenance history, and recalls issued and/or implemented. Vehicle history may be received from a service facility, such as a car dealership or mechanic, or from a state vehicle registration bureau, among others.

In some embodiments, the fault assessment system 100 may receive telematics 245, such as motion data, on-board diagnostic data, vehicle computer outputs, mobile phone data captured by in-vehicle systems, vehicle-to-vehicle communications information, vehicle-to-city Internet of Things (IoT) communications, and on-board video captured by vehicle systems.

In some embodiments, the fault assessment system 100 may receive road and location information 250, including road or intersection type, traffic density history, whether the location is a construction site, information regarding the presence of signage, such as stop or yield signs, or traffic lights, and location loss or accident history for the location. Various road and location information 250 may be received from insurance provider computing systems, police reports, and traffic reports, among others.

In some embodiments, the fault assessment system 100 may receive smart city IoT data 255, including information from street cameras, red light cameras, security cameras, and/or road sensors. For example, smart city IoT data 255 may provide photos or video of an accident, or of vehicles involved in the accident; road sensors may indicate the position or speed of vehicles involved in the accident; and red light cameras and security cameras may similarly provide photos or video of an accident, or of vehicles involved in the accident.

In some embodiments, the fault assessment system 100 may receive weather information 260, indicating precipitation, and/or temperature at the time of an accident. Weather information 260 may be received from various weather reporting services, for example via network interface 111 of FIG. 1, and may include an indication of whether a road surface was wet or covered with frozen precipitation, such as ice or snow. In some embodiments, information from smart city IoT data 255 may be used to verify, or augment, the weather information 260. For example, an image or video at the accident location may capture precipitation that was not in the weather forecast, or may capture a wind gust, as evidenced by motion of tree limbs in a video, as further input to the fault assessment system 100.

In some embodiments, after an accident has occurred involving a vehicle, the fault assessment system 100 may assess proportional fault liability among a human driver of the vehicle and one or more vehicle systems, based on one or more of the inputs described above.

In some embodiments, the fault assessment system 100 may determine that an autonomous feature of a vehicle has failed to perform as designed, and may assign a portion of fault for the accident to the failed autonomous feature. For example, the fault assessment system 100 may determine, based on vehicle information 230 and telematics 245, that a forward collision mitigation system did not activate an automatic braking feature before a collision. Accordingly, the fault assessment system 100 may assess a portion of the fault for the accident to the forward collision mitigation system.

The fault assessment system 100 may include, or be associated with, one or more machine learning algorithms, configured to model an accident and determine one or more expected outcomes. The model of the accident may be based on one or more of the inputs described above (inputs 205-260 of FIG. 2). Various models of the accident may be generated by varying the expected performance/function of autonomous features in a vehicle involved in the accident. In some embodiments, the fault assessment system 100 may be configured to predict a likelihood of a collision, given circumstances surrounding an accident. The fault assessment system 100 may, in some embodiments, compare a model of the accident to an observed outcome of the accident, and assess fault liability based on the comparison. In various embodiments, the one or more machine learning algorithms may include a gradient boosting algorithm.

In some embodiments, the one or more machine learning algorithms may be configured to model an expected behavior of a human driver for comparison with an observed outcome of the accident. For example, the model may be configured to determine whether or not the human driver applied the brakes, based on a comparison of the model and an observed braking signature. In some embodiments, GPS data and/or accelerometer data, accessed via an on-vehicle communications bus such as the CAN (Controller Area Network) bus, may be used to determine a braking signature, and this signature may be compared to an expected braking signature of the forward collision detection system.

In some embodiments, a model of the accident may be constructed to model performance of autonomous features, based on an assumption that the features worked correctly. The fault assessment system 100 may use the model to determine an expected outcome of the accident, based on the assumed performance of the autonomous features and based on input information about the environment, such as weather information 260, telematics 245 from vehicles involved in the accident, and smart city IoT data 255. Using machine learning, a simulation, or model of the vehicles involved in the accident may be created and compared to what happened during the accident, to determine whether an autonomous feature failed, and probabilities of liability may be assessed and output. For an autonomous feature, a model may be trained for a particular autonomous feature, given various manufacturers, configurations, and hardware/software versions, including updates. Machine learning may be used in determining liability based on multiple scenarios, including inappropriate use of the autonomous feature, use of a deprecated software version, or a manual override of an autonomous feature, among others. In some embodiments, it may be determined whether the autonomous feature engaged in time to prevent the accident, or with sufficient magnitude to prevent the accident.

Using the sensor data discussed above (telematics 245, for example) the fault assessment system 100 may determine whether the vehicle was hit on a side or rear, and/or whether braking was applied by the human driver or by the autonomous feature. For example the fault assessment system 100 may determine a pattern/signature associated with the observed braking during an accident. The fault assessment system 100 may model human braking and may model autonomous feature braking, and compare the observed pattern/signature to the models to determine whether the observed pattern/signature conforms to one or the other models and therefore may indicate whether the human driver or the autonomous system applied the brakes. In some embodiments, the fault assessment system 100 may model autonomous braking for various hardware and software versions of the autonomous braking feature. In addition, the fault assessment system 100 may model the human driver and/or autonomous braking feature given various weather conditions, since weather may affect the braking performance and pattern. While modeling of braking has been discussed, those skilled in the art will appreciate that the modeling of other actions as may be taken by human drivers or autonomous features may be similarly modeled in accordance with the teachings herein.

The fault assessment system 100 may process images and video, for example, via machine learning (e.g. neural networks), to aid in determining the cause of an accident and/or a fault assessment for the accident.

Figure 3:
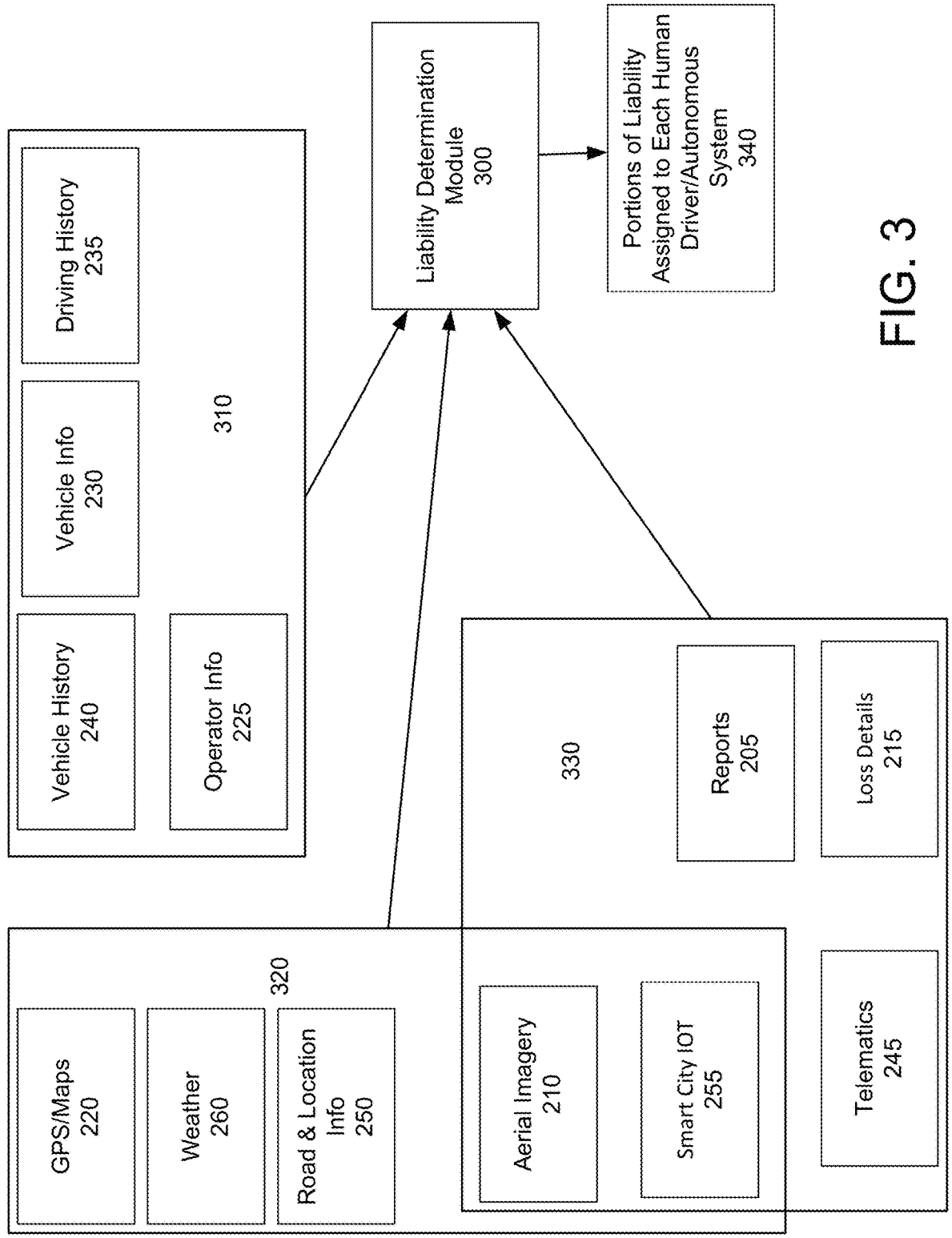
FIG. 3 illustrates a block diagram of a data flow and method in accordance with one or more aspects described herein.

FIG. 3 shows a block diagram illustrating a data flow and method performed by the fault assessment system 100 in accordance with one or more aspects described herein.

Liability determination module 300, which may be one example of an application program 121 as depicted in FIG. 1, may assess liability percentages or portions among the human driver and one or more vehicle systems, based on one or more of the inputs discussed above. In vehicle accidents involving more than one vehicle, the liability determination module 300 may assess fault percentages or portions among human drivers and among one or more vehicle systems corresponding to more than one vehicle. The liability determination module 300 may determine whether autonomous features were activated and whether or not they performed as designed. In some embodiments, the software versions of various autonomous features may be determined and liability may be assessed based on software being out-of-date.

Inputs to the liability determination module 300 may include background information 310, which may include, for each vehicle involved in an accident, the vehicle history 240, vehicle info 230, driving history 235, and/or operator info 225. Example background information 310 may include a list of autonomous features present on the vehicle, as well as details and parameters related to the functions of these features. For example, the background information 310 may indicate that the vehicle has a forward collision mitigation system and that the forward collision mitigation system is provisioned to automatically apply braking of a particular magnitude (e.g. 15 mph/s) a determined distance or time to impact with an object (e.g. 20 meters or 2 seconds). The background information 310 may indicate that the vehicle has a road sign recognition system that is able to identify a road sign, such as a stop sign, and provide a visual or audible warning to the human driver when the vehicle is within a certain distance of the stop sign (e.g. 50 meters). The background information 310 may indicate that the vehicle has a parking assist system that will halt the vehicle when moving in a reverse direction if it gets within a certain distance (e.g. 0.5 meters) of an object behind the vehicle.

Inputs to the liability determination module 300 may include external context 320, which may represent conditions at the time of the accident. The external context 320 may include GPS/maps data 220, weather data 260, road and location info 250, aerial imagery 210, and smart city IoT data 255. Imagery from the aerial imagery 210 and the smart city IoT data 255 may be processed using machine learning, such as via neural networks, before or after being input to the liability determination module 300. Example external context 320 may include information about the type of intersection where the accident occurred (e.g. four way stop), information about the weather conditions at the time of the accident (e.g. rain with a temperature of 45 F), time of day (e.g. 10 pm), and an indication of whether or not the accident site was part of a construction zone.

Inputs to the liability determination module 300 may include accident real time information 330, which may include reports 205, loss details 215, telematics 245, smart city IoT data 255, and aerial imagery 210. Imagery from the aerial imagery 210 and the smart city IoT data 255 may be processed using machine learning, such via as neural networks, before or after being input to the liability determination module 300. Reports 205 and loss details 215 may be processed using machine learning, such as via natural language processing algorithms, before or after being input to the liability determination module 300. Example real time information 330 may include speed readings captured at various time marks leading to the accident, accelerometer readings leading up to impact, and direction heading information captured at various time marks leading to the accident (for example, from a GPS system).

In order to assess liability percentages or portions among the human driver and one or more vehicle systems, the fault assessment system 100, using machine learning, may determine expected behaviors of autonomous systems and of human drivers, and then identify fault proportions based on differences between the expectation and what actually happened during the accident.

An output 340 of the liability determination module 300 may include the portions of liability assigned to each human driver and autonomous system. The output 340 may include a listing of corresponding liabilities associated with various parties involved in the accident.

By way of illustration, consider an example accident in which a first vehicle approaches a four-way intersection and fails to stop at a stop sign, thereby colliding with a second vehicle that is already legally in the intersection. The liability determination module 300 may assess 100% of the liability to a first party which may correspond to the first vehicle and 0% of the liability to a second party which may correspond to the second vehicle.

In some embodiments, the liability determination module 300 may further assess liability among the human driver of the first vehicle and various hardware and software components in the first vehicle. In this example accident, the background information 310 may indicate that the first vehicle has a forward collision mitigation system, a road sign recognition system, and a parking assist system. Real time information 330 may indicate that the forward collision mitigation system in the first vehicle applied the brakes with a magnitude of 15 mph/s, 20 meters and 2 seconds before impact, and that a road sign recognition system of the first vehicle identified a stop sign, and provided a visual and audible warning to the human driver 50 meters before the stop sign. The liability determination module 300 may determine that the human driver failed to apply the brakes before the forward collision mitigation system activated emergency braking. Given this scenario, the liability determination module 300 may assess 20% of the liability to the human driver (failed to apply the brakes), 0% to hardware such as sensors and communication equipment (which may have functioned as designed), and 80% to software, where the 80% may be divided 70% to the forward collision mitigation system (which failed to avoid the collision) and 10% to the road sign recognition system (which should have warned the driver earlier), with the parking assist system being assessed 0% liability (not involved in the collision).

In some embodiments, the liability determination module 300 may determine liability among human drivers of vehicles having no autonomous features, based on the inputs discussed above and based on the observed behavior of the vehicles involved in the accident. For example, telematics 245 may indicate that one human driver, who was following a vehicle driven by a second human driver, applied the brakes later than would have been expected of a driver who was paying attention to their driving, thereby leading to a rear end collision.

In some embodiments, in addition to or instead of the methods discussed above, liability may be manually determined, based on regulations and business preferences. High likelihood models as determined by the liability determination module 300 may be considered as viable scenarios.

In some embodiments, the one or more machine learning algorithms may be configured to include in the model components representing vehicle safety (which, if present, activated, and working properly, may lower a likelihood of a collision) and components representing human driver safety (which may include aspects such as distracted driving and expected reaction time, among others.)

For liability determination, in some embodiments, the model may be scored while varying components of the vehicle and human driver safety features, thereby providing likelihoods of collisions for different combinations of human and autonomous feature engagement. A higher likelihood may indicate a model scenario that is more likely to have happened. For example, the model may be scored for a scenario modeling a distracted driver, having a slower reaction time, or modeled with autonomous features deactivated, or with assumed failed hardware or software for autonomous features.

As another example, if police report and witness statements indicate that one of the vehicles in a collision was stopped before the collision, that vehicle may receive a high safety score in both human driver and autonomous feature categories. In this example, simulations might then only be run for varying safety components for another involved vehicle.

Telecommunication records may be used to adjust the human driver safety scores. For example, if telecommunication records indicate that a driver was texting, on a call, or otherwise using their phone leading up to an accident, the human driver safety score may be dramatically lowered in various models.

Figure 4:
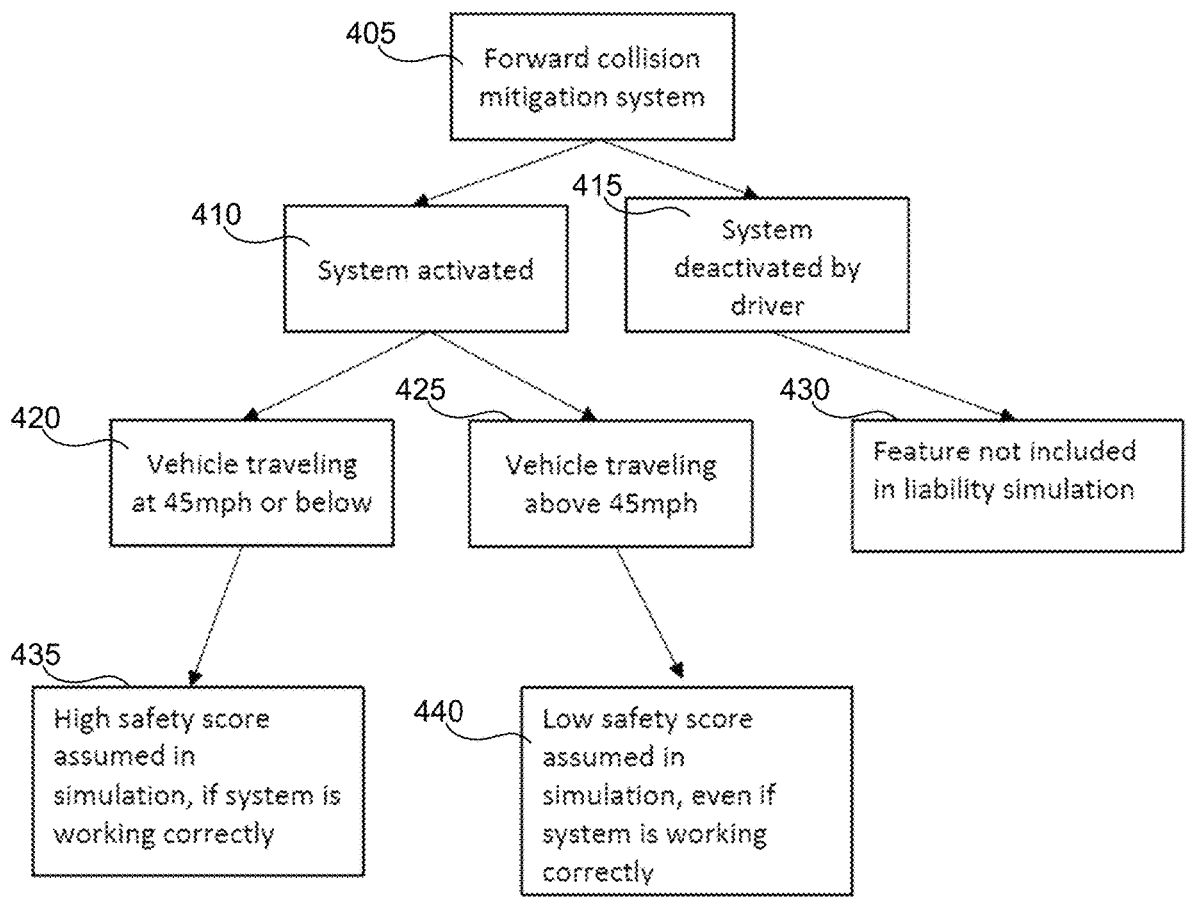
FIG. 4 illustrates an exemplary decision tree in accordance with one or more aspects described herein.

FIG. 4 illustrates a decision tree for obtaining a safety score for an autonomous system in accordance with one or more aspects described herein. Using historical insurance data (for example, as training data for a machine learning algorithm), safety scores may be obtained for different types of autonomous features under varying circumstances. If a vehicle has a high safety score for a particular feature, but a simulation indicates that an accident was most likely when that feature is given a low safety score, then it may be determined that the autonomous system was not working correctly and liability for the accident may be assessed to the autonomous system.

FIG. 4 illustrates such a flow in relation to a forward collision mitigation system. At step 405 it may be determined whether the forward collision mitigation system was activated 410 or deactivated 415 at the time of the accident. If the system was deactivated 415, then at step 430 it may be determined that the forward collision mitigation will not be included in a liability simulation. If the system was activated, then it may be determined whether the vehicle was traveling above 45 mph (step 425) or not (step 420). If the vehicle was traveling at 45 mph or below, then the forward collision mitigation may, at step 435, be assigned a high safety score in the simulation, if the system is working correctly. If the vehicle was traveling above 45 mph (425), then the forward collision mitigation may, at step 440, be assigned a low safety score in the simulation, even if the system is working correctly.

Based on information about systems in the vehicle and their versions, the fault assessment system 100 may determine whether an autonomous feature should have taken an action, and if it did not take the action, some fault may be assessed to that feature, which may cause liability to be assessed to the manufacturer of the vehicle or to the manufacturer of the autonomous feature.

Figure 5:
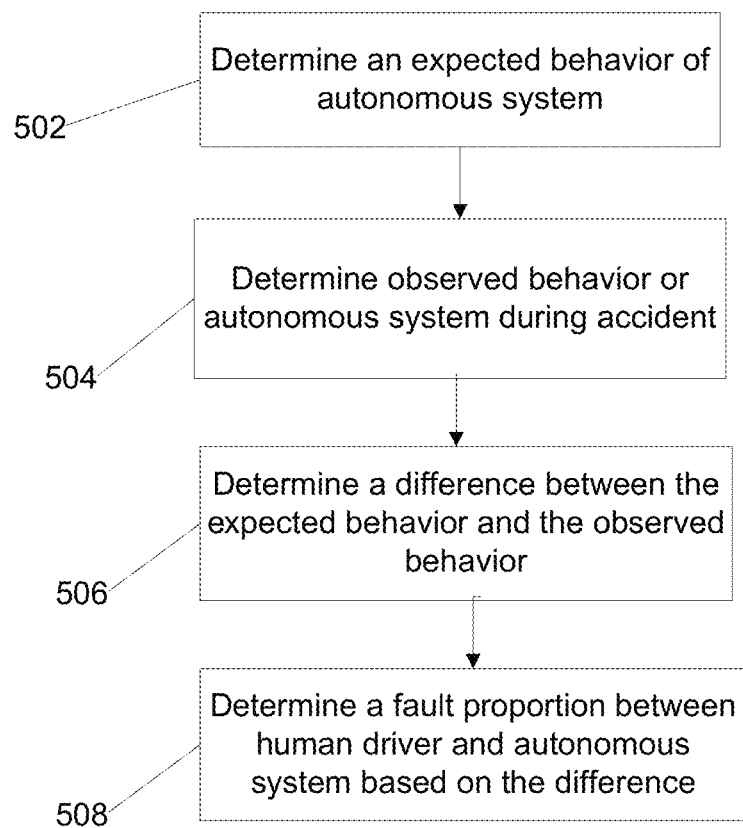
FIG. 5 illustrates an exemplary method in accordance with one or more aspects described herein.

FIG. 5 illustrates an exemplary method in accordance with one or more aspects described herein. At step 502, an expected behavior of an autonomous driving system of a vehicle may be determined. The expected behavior of an autonomous driving system may be based on the background information 310 and the external context 320 discussed above. For example, an expected braking behavior of a forward collision mitigation system may be determined. In various embodiments, the autonomous driving system may include, in addition to or instead of the forward collision mitigation system, a lane keep assist system, a road sign recognition system, or a parking assist system.

At step 504, an observed behavior of an autonomous driving system of a vehicle may be determined. The observed behavior of an autonomous driving system may be based on the real time information 330. For example, an observed braking behavior of the forward collision mitigation system may be determined. In some embodiments, it may be determined whether or not the autonomous driving system was activated, a time of the activation may be determined, and a magnitude of the activation may be determined. In some embodiments, the observed behavior of the autonomous system may include an output from an accelerometer, a GPS receiver, or a gyroscope. For example, these observed behaviors may provide information about the position or motion of the vehicle during, before, or after an accident.

At step 506, a difference between the expected behavior and the observed behavior may be determined. For example, it may be determined whether or not the autonomous driving system was activated and performed in the manner expected.

At step 508, a fault proportion between a human driver and the autonomous system may be determined, based on the difference. In some embodiments where the autonomous driving system did not perform as expected, a portion of fault may be assessed to the autonomous driving system. For example, if the human driver was following another vehicle too closely before colliding into the rear of the followed vehicle, then a portion of the fault may be assessed to the human driver. Continuing the example, if the forward collision mitigation system failed to activate as expected, then a portion of the fault may be assessed to the forward collision mitigation system.

In some embodiments, a likelihood of a collision may be modeled, based on information describing the accident, wherein the determining the fault proportion may be based on the modeling. The information describing the accident may include a police report or a witness statement.

In some embodiments, an expected behavior of a human driver of the vehicle may also be determined, for example, via machine learning, and a portion of the fault may be assessed to the human driver based on a difference between an observed behavior of the human driver and the expected behavior of the human driver.

In some embodiments, the expected human behavior may be based on a past driving behavior of the human driver, including mobile phone use or a route pattern driven.

Figure 6:
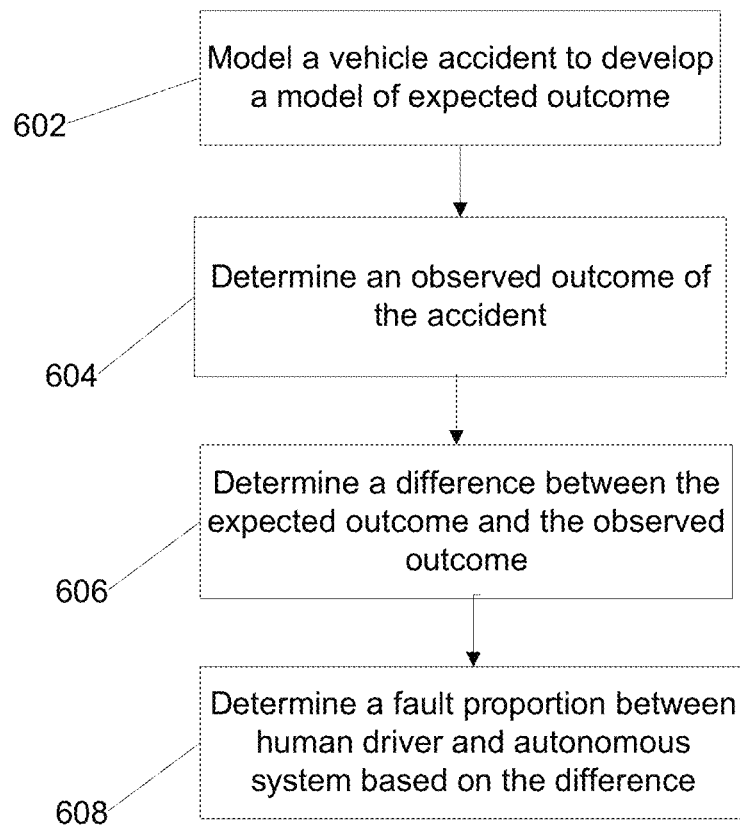
FIG. 6 illustrates another exemplary method in accordance with one or more aspects described herein.

FIG. 6 illustrates another exemplary method in accordance with one or more aspects described herein. At step 602, a vehicle accident may be modeled to develop a model of an expected outcome. The expected outcome may be based on the background information 310 and the external context 320 discussed above. In some embodiments, the modeling may include obtaining a safety score for an autonomous system of the vehicle corresponding to each of a plurality of potential vehicle states, as discussed above in relation to FIG. 4. In various embodiments, the autonomous system may include a forward collision mitigation system, a lane keep assist system, a road sign recognition system, and/or a parking assist system.

In some embodiments, the modeling may be based in part on a written report describing the vehicle accident. In various embodiments, the modeling may include modeling an aspect of vehicle safety and/or modeling an aspect of human driver safety. For example, the modeling may include modeling an operation of the autonomous system and/or modeling an expected reaction time of the human driver. In some embodiments, the modeling may include determining, for a plurality of combinations of human driver actions and autonomous system actions, a likelihood of a collision.

At step 604, an observed outcome of the accident may be determined. The observed outcome may be based on the real time information 330, discussed above.

At step 606, a difference between the expected outcome and the observed outcome may be determined.

At step 608, a fault proportion between a human driver and an autonomous system may be determined, based on the difference. In some embodiments where a likelihood of a collision is modeled as discussed above, the determining the fault proportion may be based on the likelihood.

In some embodiments, the modeling may be performed by a computing device using a machine learning algorithm. The modeling may include obtaining a safety score for an autonomous system of the vehicle corresponding to each of a plurality of potential vehicle states. For example, regarding a forward collision mitigation system, a vehicle state may include a speed above a predetermined threshold, such as 45 MPH, and the safety score may be a score representing a less safe score. In some embodiments, the safety scores for the autonomous system of the vehicle may be based on historical insurance data.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the figures may be performed in other than the recited order, and that one or more steps illustrated may be optional in accordance with aspects of the invention.

What is claimed is:

1. A method comprising:
   determining, by a computing device, an expected behavior of an autonomous system in a vehicle;
   determining, by the computing device and via machine learning, an expected behavior of a human driver of the vehicle;
   determining, an observed behavior of the autonomous system during an accident;
   determining whether the autonomous system failed to perform the expected behavior of the autonomous system based on the expected behavior of the autonomous system and the observed behavior of the autonomous system; and
   determining a fault proportion between the human driver of the vehicle and the autonomous system based on the determination of whether the autonomous system failed to perform the expected behavior of the autonomous system.

2. The method of claim 1, further comprising:
   determining an observed behavior of the human driver during the accident;
   determining whether the human driver of the vehicle failed to perform the expected behavior of the human driver based on the expected behavior of the human driver and the observed behavior of the human driver,
   wherein the determining the fault proportion between the human driver of the vehicle and the autonomous system is further based on the determination of whether the human driver failed to perform the expected behavior of the human driver.

3. The method of claim 2, further comprising:
   determining a past driving behavior of the human driver, including a mobile phone use or a route pattern driven, wherein the determining the expected behavior of the human driver is based on the past driving behavior of the human driver as well as behaviors of other drivers in similar situations.

4. The method of claim 1, further comprising:
modeling a likelihood of a collision, based on information describing the accident, wherein the determining the fault proportion is based on the modeling.

5. The method of claim 4, wherein the information describing the accident comprises a police report or a witness statement.

6. The method of claim 1, wherein the expected behavior of the autonomous system comprises an expected braking behavior, wherein the observed behavior of the autonomous system comprises an observed braking behavior, and wherein the determining the fault proportion between the human driver of the vehicle and the autonomous system is based on a difference between the observed braking behavior and the expected braking behavior.

7. The method of claim 1, wherein the autonomous system in the vehicle comprises a forward collision mitigation system, a lane keep assist system, a road sign recognition system, or a parking assist system.

8. The method of claim 1, wherein the observed behavior of the autonomous system comprises output from an accelerometer, a GPS receiver, or a gyroscope.

9. The method of claim 1, wherein the observed behavior of the autonomous system is based on an activation of the autonomous system, a time of the activation, and a magnitude of the activation.

10. A method comprising:
modeling, by a computing device and via machine learning, a vehicle accident to develop a model of an expected behavior of an autonomous system in a vehicle;
determining an observed outcome of the vehicle accident;
determining whether the autonomous system failed to perform the expected behavior of the autonomous system based on the expected behavior of the autonomous system and the observed outcome of the vehicle accident; and
determining a fault proportion between the human driver of the vehicle and the autonomous system based on the determination of whether the autonomous system failed to perform the expected behavior of the autonomous system.

11. The method of claim 10, wherein the modeling is based on an input comprising a written report describing the vehicle accident.

12. The method of claim 10, wherein the modeling the vehicle accident comprises:
modeling an aspect of vehicle safety; and
modeling an aspect of human driver safety.

13. The method of claim 12, wherein the modeling the aspect of vehicle safety comprises modeling an operation of the autonomous system.

14. The method of claim 12, wherein the modeling the aspect of human driver safety comprises modeling an expected reaction time of the human driver.

15. The method of claim 10, wherein the modeling the vehicle accident comprises:

determining, for a plurality of combinations of human driver actions and autonomous system actions, a likelihood of a collision, wherein the determining the fault proportion is based on the determined likelihood.

16. A method comprising:
modeling, by a computing device and via machine learning, a vehicle accident to develop a model of an expected behavior of an autonomous system in a vehicle, wherein the modeling comprises obtaining a safety score for an autonomous system of the vehicle corresponding to each of a plurality of potential vehicle states;
determining an observed outcome of the vehicle accident;
determining whether the autonomous system failed to perform the expected behavior of the autonomous system based on the expected behavior of the autonomous system and the observed outcome of the vehicle accident; and
determining a fault proportion between a human driver of the vehicle and the autonomous system of the vehicle based on the determination of whether the autonomous system failed to perform the expected behavior of the autonomous system.

17. The method of claim 16, wherein the autonomous system in the vehicle comprises a forward collision mitigation system, a lane keep assist system, a road sign recognition system, or a parking assist system.

18. The method of claim 17, wherein the autonomous system in the vehicle comprises the forward collision mitigation system, a vehicle state of the plurality of potential vehicle states comprises a speed above a predetermined threshold, and wherein the obtaining the safety score comprises determining that the safety score is a score representing a less safe score.

19. The method of claim 16, further comprising:
determining, by the computing device and via machine learning, an expected behavior of the human driver of the vehicle; and
determining an observed behavior of the human driver during the vehicle accident, wherein the determining the fault proportion between the human driver of the vehicle and the autonomous system is further based on a difference between the expected behavior of the human driver and the observed behavior of the human driver.

20. The method of claim 16, wherein the obtaining the safety score for the autonomous system of the vehicle corresponding to each of the plurality of potential vehicle states is based on historical insurance data.

21. The method of claim 1, wherein the determining whether the autonomous system failed to perform the expected behavior of the autonomous system is further based on a difference between the expected behavior of the autonomous system and the observed behavior of the autonomous system.

* * * * *